United States Patent [19]
Lin et al.

[11] Patent Number: 6,056,371
[45] Date of Patent: May 2, 2000

[54] FEED-FORWARD ACTIVE BRAKE CONTROL

[75] Inventors: William Chin-Woei Lin, Troy; Youssef Ahmed Ghoneim, Macomb Township, Macomb County; David Michael Sidlosky, Huntington Woods; Yuen-Kwok Chin, Troy; Cheng-Foo Chen, Rochester Hills, all of Mich.

[73] Assignee: General Motors Corporation, Detroit, Minn.

[21] Appl. No.: 09/138,685

[22] Filed: Aug. 24, 1998

[51] Int. Cl.$^7$ ................................................... B60K 28/10
[52] U.S. Cl. ................................................... 303/146; 303/155
[58] Field of Search .......................... 303/140, 146, 303/147, 155

[56] References Cited

U.S. PATENT DOCUMENTS

| | | | |
|---|---|---|---|
| 4,834,205 | 5/1989 | Mizuno et al. | 180/141 |
| 5,063,514 | 11/1991 | Headley et al. | 364/426.02 |
| 5,172,961 | 12/1992 | Inoue et al. | 303/100 |
| 5,229,944 | 7/1993 | Yasuno | 364/426.01 |
| 5,275,475 | 1/1994 | Hartmann et al. | 303/103 |
| 5,311,431 | 5/1994 | Cao et al. | 364/424.05 |
| 5,332,300 | 7/1994 | Hartmann et al. | 303/146 |
| 5,341,297 | 8/1994 | Zomotor et al. | 364/426.03 |
| 5,366,281 | 11/1994 | Littlejohn | 303/188 |
| 5,402,342 | 3/1995 | Ehret et al. | 364/424.05 |
| 5,444,621 | 8/1995 | Matsunaga et al. | 364/424.05 |
| 5,480,219 | 1/1996 | Kost et al. | 303/146 |
| 5,720,533 | 2/1998 | Pastor et al. | 303/147 |
| 5,746,486 | 5/1998 | Paul et al. | 303/146 |
| 5,805,449 | 9/1998 | Ito | 303/146 |

FOREIGN PATENT DOCUMENTS

| | | |
|---|---|---|
| 0 555 860 A1 | 8/1993 | European Pat. Off. |
| 41 23 235 C1 | 11/1992 | Germany . |
| 41 21 954 A1 | 1/1993 | Germany . |
| 42 00 061 A1 | 7/1993 | Germany . |
| 42 23 385 A1 | 1/1994 | Germany . |
| 42 29 504 A1 | 3/1994 | Germany . |
| 43 11 077 A1 | 10/1994 | Germany . |
| 43 14 827 A1 | 11/1994 | Germany . |
| 40 52 62213 | 10/1993 | Japan . |
| 40 60 24304 | 2/1994 | Japan . |
| 40 60 87421 | 3/1994 | Japan . |
| 40 61 15418 | 4/1994 | Japan . |
| 40 61 27354 | 5/1994 | Japan . |
| 2 275 551 | 1/1993 | United Kingdom . |
| 2 263 340 | 7/1993 | United Kingdom . |
| 2 269 571 | 2/1994 | United Kingdom . |
| 2 275 312 | 8/1994 | United Kingdom . |

OTHER PUBLICATIONS

Please also see copending patent applications H–197212, H–198284, H–200222, H–200280, H–200369 and H–200888.

May the Cornering Force be With You; Popular Mechanics; Dec. 1995, pp. 74–77.

Stable as She Goes: Don Sherman, Automotive Industries, May 1995.

The Spin Doctors: Don Sherman, 12PS95.

Mercedes/Bosch ESP; Automotive Industries, Apr. 1995.

(List continued on next page.)

*Primary Examiner*—Robert J. Oberleitner
*Assistant Examiner*—Lan Nguyen
*Attorney, Agent, or Firm*—Anthony Luke Simon

[57] ABSTRACT

An improved active brake control in which differential braking is used in a feed-forward control to develop vehicle yaw in response to a desired yaw value determined as a function of steering wheel position and vehicle speed. The desired yaw rate value is used to develop a derivative yaw component and a proportional yaw component, which are summed to form a feed-forward yaw command for differential braking. Both proportional and derivative components have limited control authority determined by dead-band and saturation thresholds, and the proportional term is subjected to a diminishing integrator which reduces the yaw command as the desired yaw rate value approaches steady-state.

11 Claims, 8 Drawing Sheets

OTHER PUBLICATIONS

Controlling Vehicle Stability; Christopher A. Sawyer, Automotive Industries, Jan. 1995.

Let Magic Fingers do the Driving: Wards Auto World; May 1995.

Technoid: Intelligent Brakes are on the Way; Car and Driver, Aug. 1994.

Toyota Vehicle Stability Control System; Automotive Engineering, Aug. 1995.

Vehicle Dynamics Offers New Level of Safety: Machine Design, Sep. 1994.

Handling Control Systems for Your Car: Popular Electronics; Feb. 1995.

VDC, The Vehicle Dynamics Control System of Bosch: A. VanZanten, R. Erhardt and G. Pfaff; Robert Bosch GmbH; No. 950759, pp. 9–26.

Active Stability Control. Junichi Kubokawa, Aisin Seiki Co., Ltd., Electronics & Brake Division; Abstract; Sep. 1995.

Consideration of Lateral and Longitudinal Vehicle Stability by Function Enhanced Brake and Stability Control System; Heinz Leffler; SAE #940832; Feb. 28–Mar. 3, 1994.

Control of Vehicle Dynamics: Automotive Engineering; pp. 87–93; May 1995.

Improvement of Vehicle Maneuverability by Direct Yaw Moment Control; Y. Shibahata, K. Shimada and T. Tomari; Society of Automotive Engineers of Japan, Inc.; pp. 464–481.

Spin Control for Cars; Steven Ashley; Mechanical Engineering; pp. 66–68; Jun. 1995.

FEED-FORWARD ACTIVE BRAKE CONTROL

TECHNICAL FIELD

This invention relates to a motor vehicle active brake control, and more particularly to a control in which the active brake commands are determined using a feed-forward control.

BACKGROUND OF THE INVENTION

Chassis control technology has achieved noteworthy progress, thanks to advancements in sensing and computing technologies as well as advances in estimation and control theory. This has permitted the design of various control systems using active means to achieve a more maneuverable vehicle. One such enhancement is the control and adjustment of tire forces through a braking force distribution control strategy, using steering wheel angle and yaw rate as feedback. However, the sensors typically required to mechanize such a control strategy contribute to increased system cost. Additionally, closed-loop feedback systems are inherently based on an observed error, so that the resulting control is of a corrective nature, lagging the operator commands. Accordingly, it is desired to provide a low cost active braking control that derives its control from the operator commands to provide more responsive vehicle handling.

SUMMARY OF THE PRESENT INVENTION

The present invention is directed to an improved active brake control in which differential braking is used in a feed-forward control to develop vehicle yaw in response to a desired yaw value determined as a function of steering wheel position and vehicle speed. The desired yaw rate value is used to develop a derivative yaw component and a proportional yaw component, which are summed to form a feed-forward yaw command for differential braking. Both proportional and derivative components have limited control authority determined by dead-band and saturation thresholds, and the proportional term is subjected to a diminishing integrator which reduces the yaw command as the desired yaw rate value approaches steady-state.

DETAILED DESCRIPTION OF THE INVENTION

Figure 1:
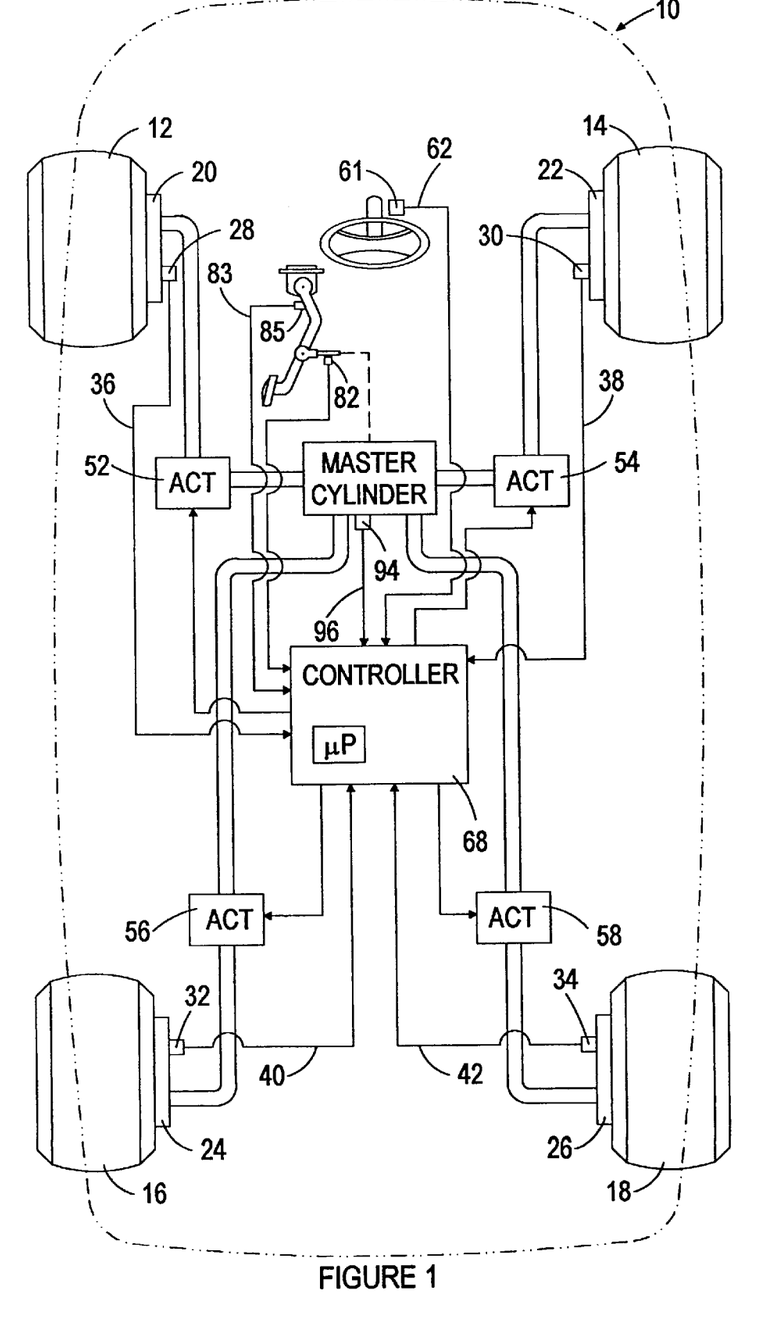
FIG. 1 is a diagram of a vehicle including an electronic controller and associated input and output devices constituting a control system for carrying out an active brake control.

FIG. 1 depicts a mechanization of an active brake control according to this invention on a vehicle 10. The vehicle 10 includes a brake system having a micro-processor based controller 68 for controlling the brakes 20, 22, 24, 26 of the respective wheels 12, 14, 16, 18. The controller 68 receives various inputs, including wheel speed signals on lines 36, 38, 40, 42 from respective wheel speed sensors 28, 30, 32, 34; a brake pedal travel signal on line 83 from pedal travel sensor 85; a brake switch signal from brake switch 82; a steering wheel angle signal on line 62 from angle sensor 61; and a master cylinder pressure signal on line 96 from the pressure sensor 94. The sensors 28, 30, 32, 34, 61, 82, 85, 94 may be implemented with conventional devices in a manner known to those skilled in the art.

Under certain conditions such as wheel lock-up or spinning, or lateral instability, the controller 68 modifies the normal braking of one or more wheel 12, 14, 16, 18 via the respective actuators 52, 54, 56, 58 in order to restore a desired overall operation of the vehicle. In an incipient lock-up condition, the controller 68 commands one or more of the respective actuator(s) 52, 54, 56, 58 to modulate the brake force developed at the wheel(s) experiencing the condition. In a wheel slip condition, the controller 68 commands one or more of the respective actuator(s) 52, 54, 56, 58 to develop brake force at the slipping wheel(s). In a case of lateral instability, the controller 68 commands one or more of the respective actuator(s) 52, 54, 56, 58 selectively increase or decrease the brake forces generated at the various wheels 12, 14, 16, 18 to produce a commanded yaw; the control may be carried in a two-channel system in which only the front brakes 20, 22 are controlled, or a four-channel system in which all four brakes 20, 22, 24, 26 are controlled. Exemplary actuators are shown and described in detail in the U.S. Pat. No. 5,366,281, assigned to the assignee of the present invention.

According to this invention, a feed-forward yaw control is carried out as a function of vehicle speed (which may be determined from the four wheel speed sensors) and steering wheel position. Using these inputs, the controller 68 determines a feed-forward yaw command, which is implemented in the illustrated embodiment in the form of a differential wheel speed command $\Delta V$. Alternatively, the commanded yaw can be implemented as a differential brake force command. In either implementation, the wheel brakes are differentially activated to achieve the commanded yaw control.

Figure 2:
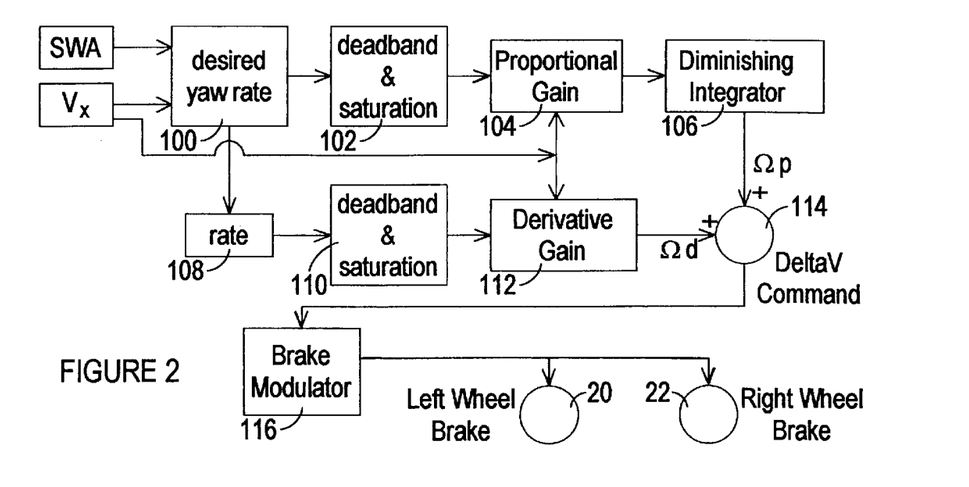
FIG. 2 is a block diagram of the feed-forward control carried out by the electronic controller of FIG. 1 according to this invention.

FIG. 2 depicts a block diagram of the control. The steering wheel angle (δ) and longitudinal vehicle speed ($V_x$) are provided as inputs to block 100, which determines a desired yaw rate $\Omega_{des}$. The desired yaw rate $\Omega_{des}$ is provided to blocks 102–106 which develop a proportional gain component $\Omega_p$, and to blocks 108–112 which develop a derivative yaw in component $\Omega_d$. The order of blocks 102 and 104 may be reversed if desired, as may the order of blocks 110 and 112. The proportional and derivative gain components $\Omega_p$ and $\Omega_d$ are summed at block 114 to form a yaw command which may be in the form of a differential velocity ΔV, a differential braking force ΔF, or a differential moment ΔM. For purposes of this disclosure, the command is considered as a differential moment ΔM. Finally, the differential moment ΔM is provided to block 116 which activates the wheel brakes in a manner to develop a differential brake force that achieves the ΔV command. The brake control can be a two-channel system in which only front wheel braking is controlled, or a four-channel system in which all four wheels are individually controlled.

The desired yaw rate $\Omega_{des}$, may be determined according to the expression:

$$\Omega_{des}=V_x\delta/(L+K_u V_x^2) \quad (1)$$

where L is wheel base of the vehicle, and $K_u$ is an understeer coefficient. The vehicle speed $V_x$ may be derived either from the wheel speed information provided by sensors 28–34, or by another indication such as a transmission output shaft speed.

Figure 3:
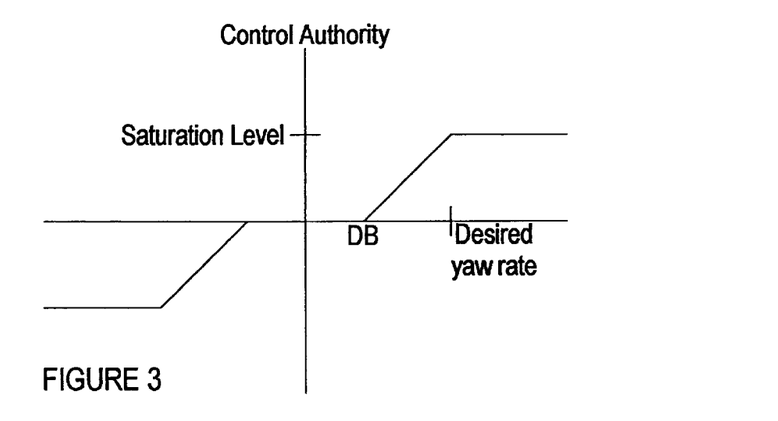
FIG. 3 is a graph representing a dead-band and saturation authority control according to this invention.

Block 102 applies a dead-band function the desired yaw rate $\Omega_{des}$ to determine if the steering maneuver warrants activation of the active braking control. A preferred mechanization of the dead-band is depicted in FIG. 3, where the y-axis represents the desired yaw rate output for a given desired yaw rate input. For $|\Omega_{des}|\leq DB$, the desired yaw rate output is zero, meaning that feed-forward activation of the active brake control is not warranted. For desired yaw rate inputs between DB and SAT, the output increases proportionately, saturating when $|\Omega_{des}|\geq SAT$. The saturation control effectively limits the desired yaw rate output for excessive steering inputs.

Figure 5A:
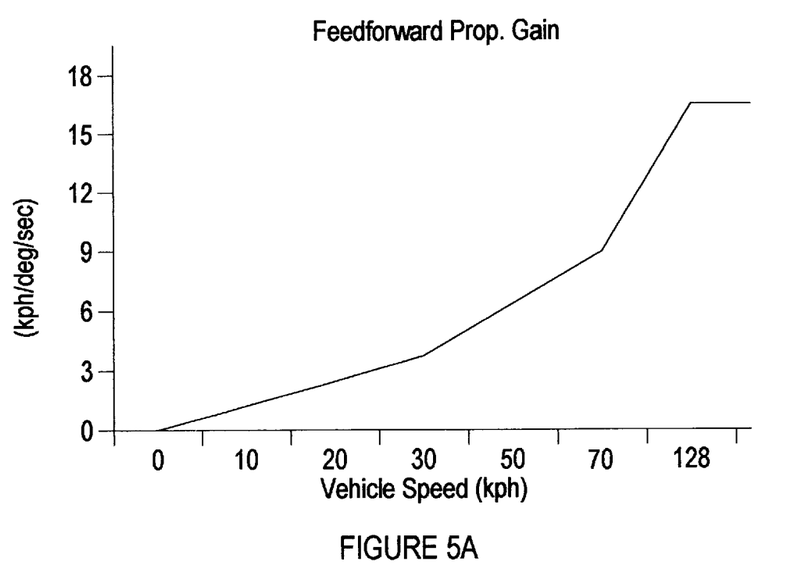
FIG. 5A is a graph depicting a proportional gain term as a function of vehicle speed according to this invention.

Block 104 forms a preliminary proportional yaw component $\Omega_{po}$ by applying a vehicle speed dependent gain term to the desired yaw rate $\Omega_{des}$, and applying the control authority determined at block 102 to the result. The proportional gain term, depicted in FIG. 5A, generally increases with increasing vehicle speed, as shown. If the order of blocks 102 and 104 are reversed as mentioned above, the gain term is applied to the desired yaw rate, and the dead-band and saturation functions operate on the preliminary proportional yaw component $\Omega_{po}$. Other variations are also possible.

Figure 4:
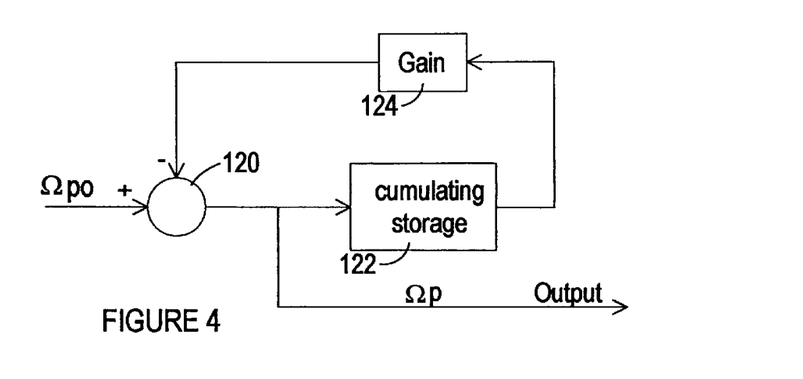
FIG. 4 is a block diagram of a diminishing integrator according to this invention.

Block 106 subjects the proportional gain term to a diminishing integrator function which reduces the preliminary proportional gain term $\Omega_{po}$ to zero at a predetermined time constant. FIG. 4 depicts a diminishing integrator in which the preliminary gain term $\Omega_{po}$ is provided as a (+) input to the summing junction 120. The output of summing junction, which forms the proportional yaw component $\Omega_p$, is provided as an input to block 122, which develops a cumulative proportional term. The output of block 122, after modified by a gain term (block 124) is applied to the (−) input of summing junction 120. Thus, if the preliminary proportional gain term $\Omega_{po}$ remains constant for a given maneuver, the proportional yaw component $\Omega_p$ will decrease to zero at a time constant determined by the gain of block 124.

An added benefit of the diminishing integrator function is that it will produce a proportional gain component $\Omega_p$ of opposite polarity when the steering wheel is returned to a center position since the preliminary proportional term $\Omega_{po}$ returns to zero immediately while the cumulative proportional term has a non-zero value. If the steering wheel is turned past center and in the opposite direction, the residual output of block 122 acts to momentarily increase the proportional gain component $\Omega_p$. In either event, this has the desirable effect of quickly reducing any undesired residual yaw.

Figure 6:
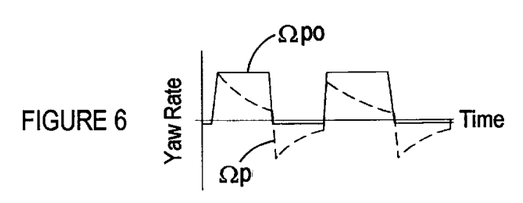
FIG. 6 is a time based graph illustrating the operation of the diminishing integrator of FIG. 4 during steering maneuvers.

FIG. 6 graphically depicts the preliminary proportional term $\Omega_{po}$ and the proportional gain component $\Omega_p$ as a function of time for a series of steering movements. The steering movements depicted in FIG. 6 represent moderate unipolar steering inputs, and illustrate both the reduction of the preliminary term and the initial output of opposing polarity when the steering wheel is returned to a center position.

Block 108 differentiates the desired yaw rate $\Omega_{des}$ to determine the rate of change of desired yaw rate. This may be determined by differencing consecutively determined values of $\Omega_{des}$ and dividing by the computation loop time. Preferably, the result is subjected to a low pass filter to reduce noise in the rate calculation.

Block 110 applies a dead-band and saturation function to the output of block 108, similar to the function described above in respect to the proportional gain term $\Omega_p$. In this case, the dead-band serves to prevent the formation of a derivative term if the computed rate of change is less than a predetermined value DB, and to limit the rate of change when the steering wheel is turned very rapidly.

Figure 5B:
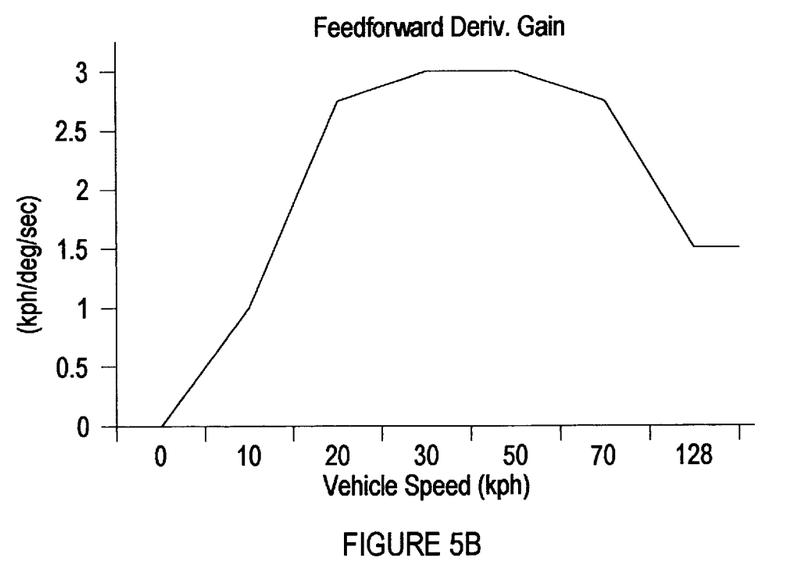
FIG. 5B is a graph depicting a derivative gain term as a function of vehicle speed according to this invention.

Block 112 forms a derivative yaw component $\Omega_d$ by applying a vehicle speed dependent gain term to the desired yaw rate $\Omega_{des}$, and applying the control authority determined at block 110 to the result. As with block 104, the derivative gain term is vehicle speed dependent. The derivative gain term, depicted in FIG. 5B, generally increases with increasing vehicle speed up to a predetermined range, as shown. At very high vehicle speeds, the derivative gain term is reduced as shown to decrease the derivative yaw component. If the order of blocks 110 and 112 are reversed as mentioned above, the gain term is applied to the desired rate of change in yaw rate, and the dead-band and saturation functions operate on the derivative yaw component $\Omega_d$. Other variations are also possible.

Figure 7A:
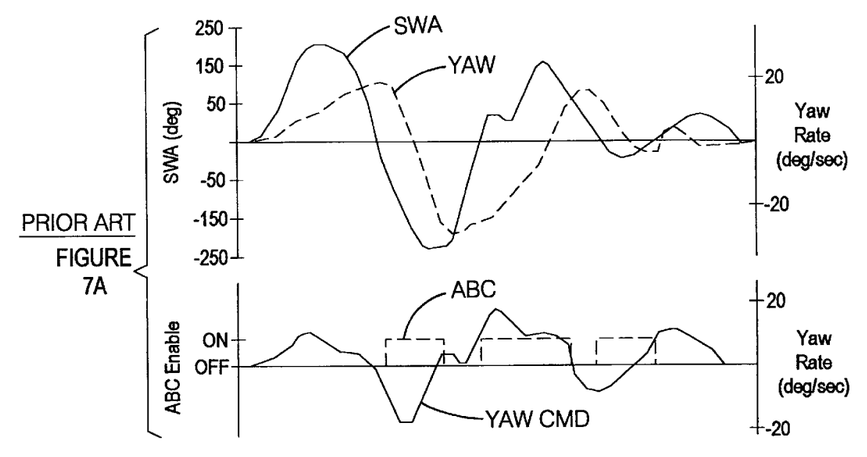
FIG. 7A graphically depicts the operation of a conventional closed-loop yaw control during an evasive steering maneuver.
Figure 7B:
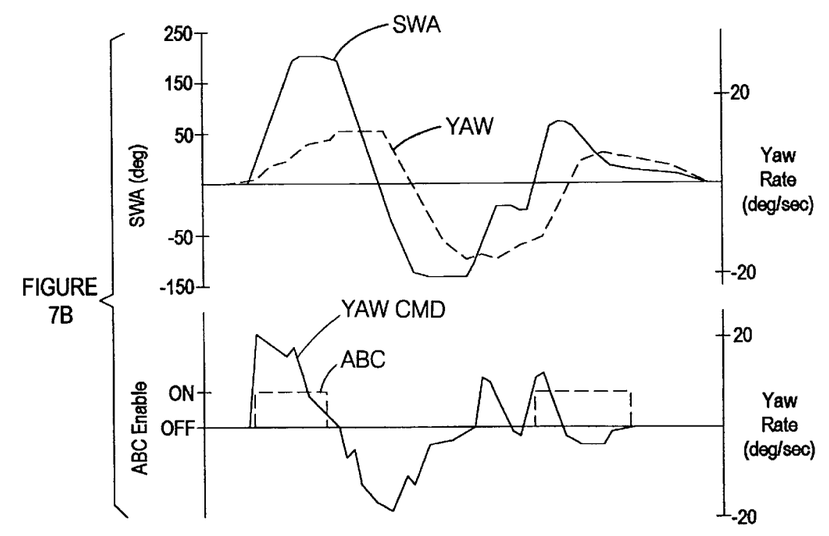
FIG. 7B graphically depicts the operation of a yaw control according to this invention during an evasive steering maneuver.

The advantageous operation of the control of this invention is graphically illustrated in FIG. 7. FIG. 7A shows the operation of a conventional closed loop yaw control for a lane change evasive maneuver performed at a constant vehicle speed of 45 MPH on snow-covered pavement, whereas FIG. 7B shows the operation of the feed-forward control of this invention for the same maneuver. In each case, the steering wheel angle (SWA), the actual yaw rate (YAW), the commanded yaw (YAW CMD), and an active brake control enable signal (ABC) are shown as a function of time.

In the closed-loop control of FIG. 7A, the yaw command builds slowly, and tends to lag the steering wheel angle input. Since active brake control is only enabled when the yaw rate error exceeds a threshold level, the actual yaw rate fails to track the reversal of steering wheel angle. When the control does become active (ABC=Enable), it produces a corrective yaw moment, but a large driver steering angle is also required. A similar situation occurs when the driver subsequently tries to reverse the yaw rate to keep the vehicle in the new lane. The relatively large corrective steering inputs required of the driver are indicative of the driver effort required to maintain control of the vehicle.

In the feed-forward control of FIG. 7B, the derivative component produces an immediate yaw command at the initiation of the steering maneuver, triggering a nearly immediate enabling of active brake control. The command is quickly reduced due to the action of the diminishing integrator, but the introduced yaw moment somewhat reduces the driver steering input, compared to the closed-loop control of FIG. 7A. The combination of a yaw command that is more in phase with the driver steering input, and that is rapidly diminished (due to the diminishing integrator) produces corrective yaw moments that of phase and magnitude that more nearly correspond to driver expectations, as seen by the reduced driver steering input required to complete the maneuver. As a result, the level of driver effort required to maintain control of the vehicle is reduced, compared with a conventional closed-loop control.

Figure 8:
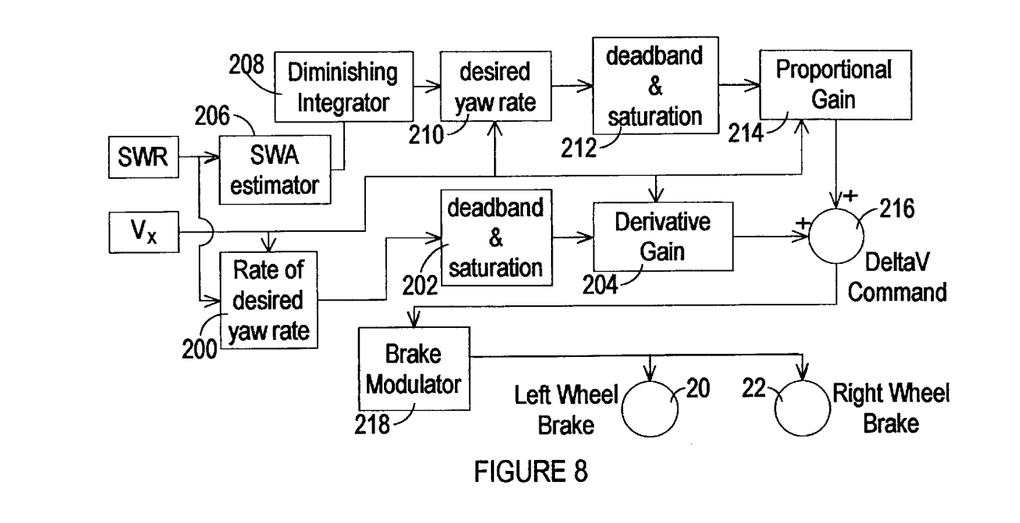
FIG. 8 is a block diagram of the feed-forward control according to this invention, but with a steering rate sensor instead of a steering angle sensor.

A somewhat different mechanization of the feed-forward control of this invention may be utilized if the vehicle is equipped with a steering wheel rate (SWR) sensor instead of a steering wheel angle (SWA) sensor. In this case, the steering position is estimated by integrating the sensed steering rate, but due to uncertain bias in the result, the steering position signal is preferably subjected to the diminishing integrator prior to computation of the desired yaw rate $\Omega_{des}$. Additionally, the rate of change of the desired yaw rate $(\Omega_{des}')$ can be obtained directly from the sensed steering rate $\delta'$, using the expression:

$$\Omega_{des}' = V_x \delta' / (L + K_u V_x^2). \tag{2}$$

A block diagram of a control utilizing a steering rate sensor is shown in FIG. 8. The steering rate $\delta'$ and longitudinal vehicle speed $V_x$ are provided as inputs to block 200, which determines $\Omega_{des}'$ using equation (2) above. The rate $\Omega_{des}'$ is applied as an input to the dead-band and saturation function block 202, which limits the derivative yaw component, and block 204 applies a velocity based gain term, to complete the derivative yaw component $\Omega_d$. The steering rate $\delta'$ is separately applied to integrator block 206 which estimates the steering angle, and applies the same as in input to diminishing integrator block 208. The output of block 208 is applied along with the vehicle speed signal $V_x$ to block 210, which determines $\Omega_{des}$ using equation (1) above. The desired yaw rate $\Omega_{des}$ is applied as an input to the dead-band and saturation function block 212, which limits the proportional yaw component, and block 214 applies a velocity based gain term, to complete the proportional yaw component $\Omega_p$. As with the block diagram of FIG. 2, the order of blocks 202 and 204 may be reversed if desired, as may the order of blocks 210 and 212. The proportional and derivative gain components $\Omega_p$ and $\Omega_d$ are summed at block 216 to form a yaw command which may be in the form of a differential velocity $\Delta V$, a differential braking force $\Delta F$, or a differential moment $\Delta M$. For purposes of this disclosure, the command is considered as a differential moment $\Delta M$. Finally, the differential moment $\Delta M$ is provided to block 218 which activates the wheel brakes in a manner to develop a differential brake force that achieves the command.

Figure 9:
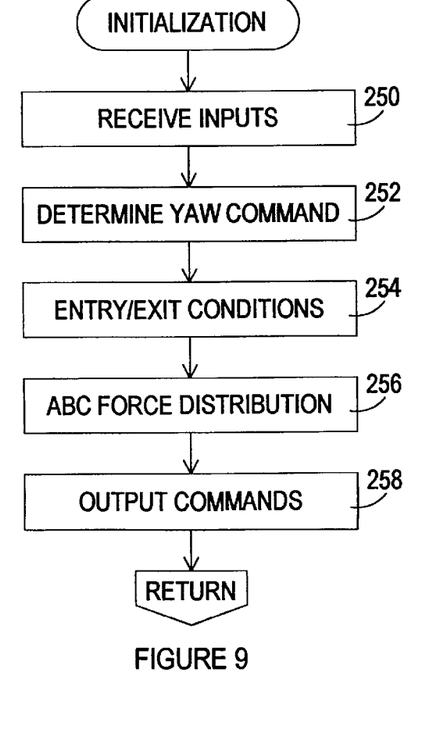
FIG. 9 is main loop flow diagram representative of computer program instructions executed by the electronic controller of FIG. 1 in carrying out the control of this invention.

A main flow diagram for an active brake control according to this invention for a system having a steering angle sensor is set forth in FIG. 9. After reading the various sensor inputs at block 250, the system executes block 252 to interpret the driver commands (i.e, to form the differential moment command $\Delta M$). The exit and enter conditions are established at block 254, and actuator commands for carrying out the command are determined and applied to actuators 52, 54, 56, 58 at blocks 256–258.

Figure 10:
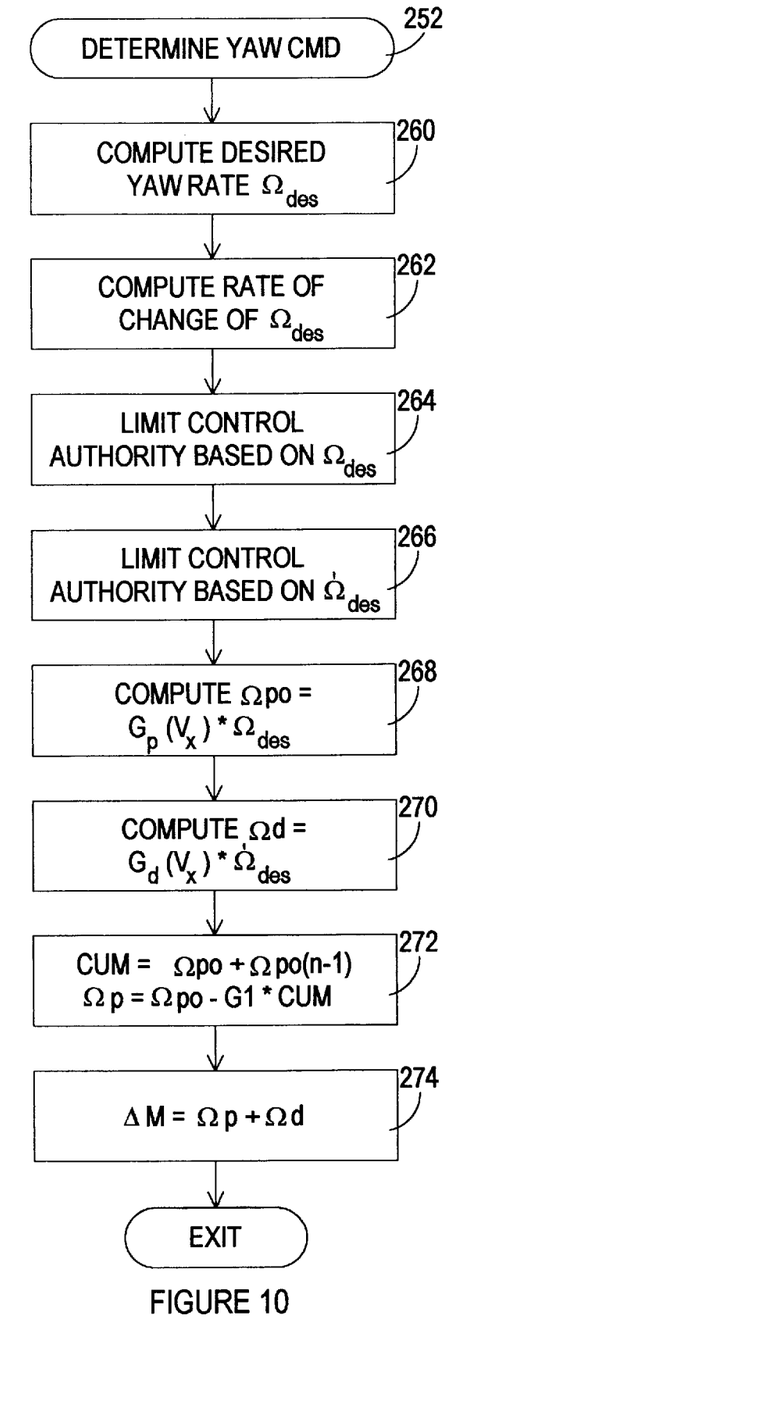
FIG. 10 is a flow diagram detailing a portion of the main flow diagram of FIG. 9 concerning the feed-forward control of this invention.

The flow diagram of FIG. 10 details the main flow diagram block 252 in which the $\Delta M$ command is developed. Initially, the block 260 is executed to compute the desired yaw rate $\Omega_{des}$ as a function of the vehicle speed, the steering wheel angle and the understeer coefficient in accordance with expression (1). Thereafter, block 262 computes the rate of change of desired yaw rate $\Omega_{des}'$. Blocks 264–266 apply a dead-band and saturation function to the computed yaw rate and change of yaw rate to limit the computed values as described above. The preliminary proportional term and the derivative terms are computed at blocks 268 and 270, respectively, and the preliminary proportional term is subjected to a diminishing integrator function at block 272. Finally, the block 274 determines a yaw rate command by summing the proportional and derivative terms, completing the yaw command determination.

Figure 11:
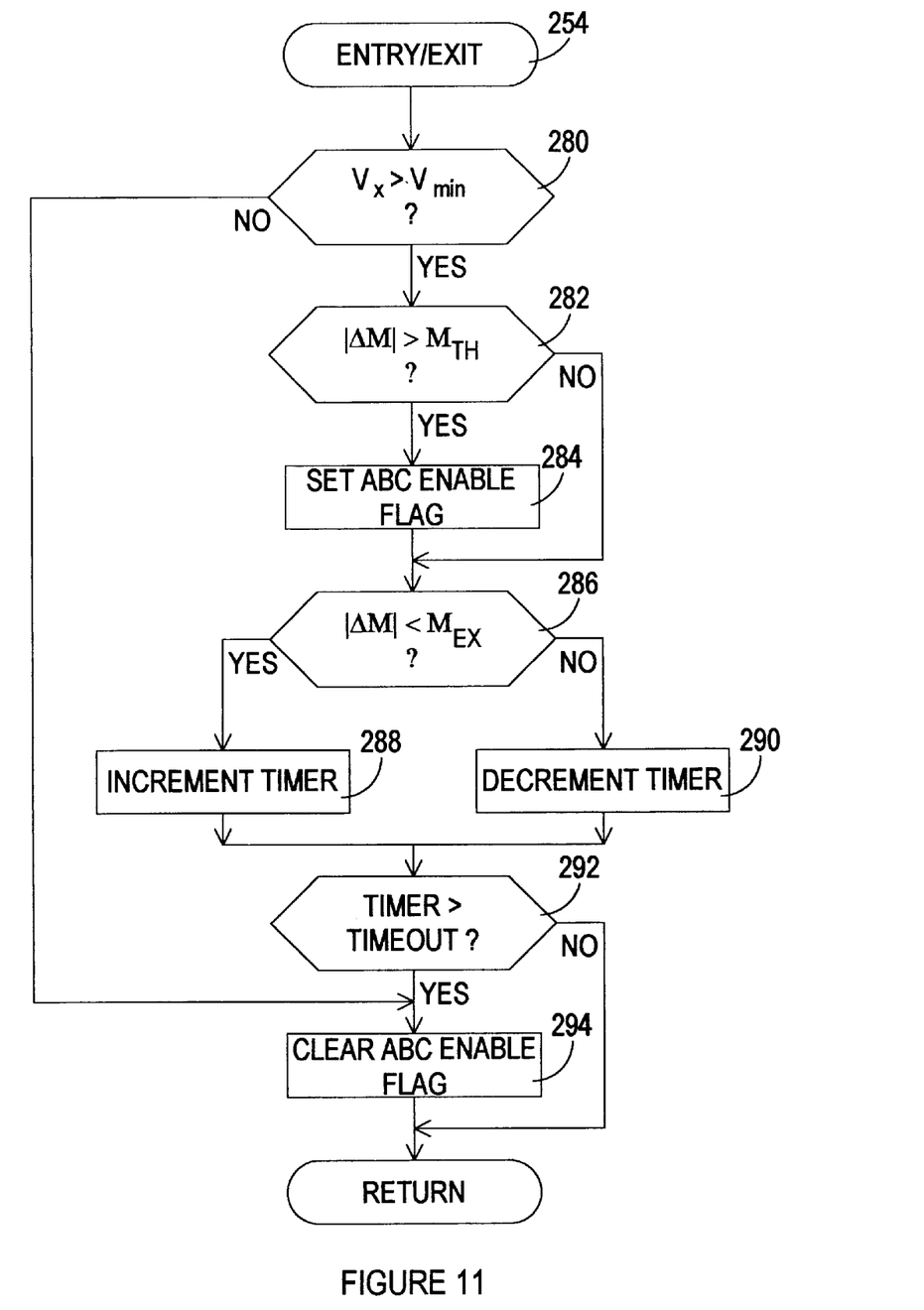
FIG. 11 depicts a flow diagram detailing a portion of the main flow diagram of FIG. 9 concerning establishment of entry and exit criteria for the active brake control.

The flow diagram of FIG. 11 details the main flow diagram block 254, in which the entry and exit conditions for yaw control are established. If the vehicle velocity $V_x$ is not greater than a minimum velocity threshold $V_{min}$, as determined at block 280, the block 294 is executed to disable active brake control by clearing the ABC ENABLE flag. If $V_x$ is greater than $V_{min}$, block 282 is executed to determine if the differential moment command $\Delta M$ exceeds a threshold moment $M_{th}$. If so, the block 284 is executed to enable active brake control by setting the ABC ENABLE flag. Blocks 286–290 are then executed to identify a condition for which the differential moment command $\Delta M$ is less than an exit threshold $M_{ex}$, and to time the period for which the identified condition is satisfied. If the timed period exceeds reference time (TIMEOUT), as determined at block 292, the block 294 is executed to disable active brake control by clearing the ABC ENABLE flag. For reference, another example of entry and exit conditions is given in the U.S. patent application Ser. No. 08/732,582, which is assigned to the assignee of this invention.

Figure 12:
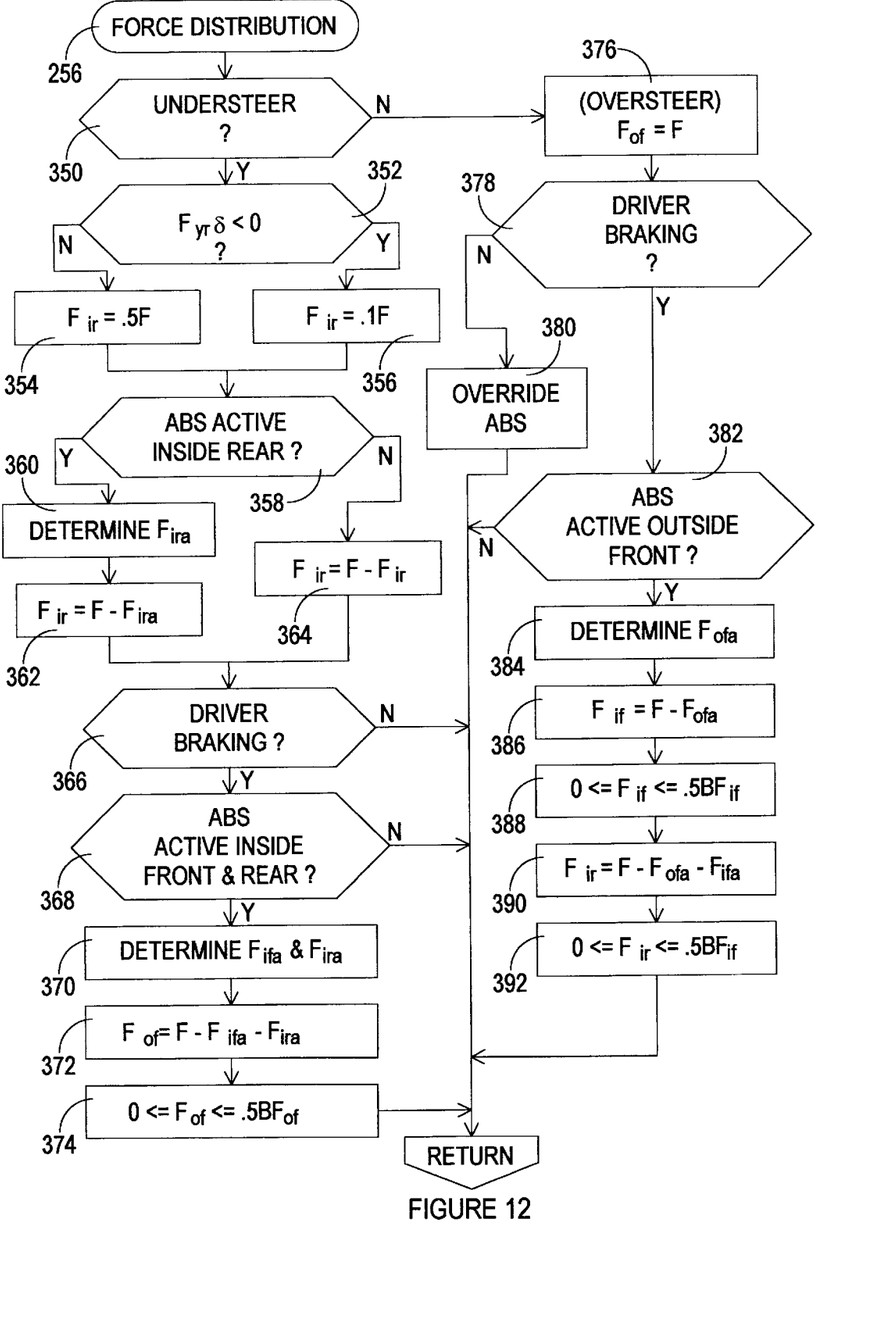
FIG. 12 is a flow diagram detailing a portion of the main flow diagram of FIG. 9 concerning development of brake force commands.

The flow diagram of FIG. 12 details the main flow diagram block 256, in which the actuator commands are developed, assuming a four channel system in which braking forces at the four corners of the vehicle are independently controlled. It is additionally assumed that the control is based on a commanded yaw moment, as opposed to a commanded wheel speed difference. The corrective yaw force F corresponding to the differential moment command $\Delta M$ is determined as $F = \Delta M/d$, where d is the track width of the vehicle.

If the vehicle is exhibiting understeer, as determined at block 350, the blocks 352–374 are executed to determine the appropriate actuator commands. If the vehicle is exhibiting oversteer, the blocks 376–392 are executed to determine the appropriate actuator commands. An understeer condition is indicated if the differential moment command $\Delta M$ and the steering angle $\delta$ have the same sign. An oversteer condition is indicated if $\Delta M$ and $\delta$ have opposite signs. A dead-zone may be employed to stabilize the indication.

In the understeer condition, braking is applied in approximately equal distribution to the inside rear and inside front wheels if there is no driver braking. However, if the estimated lateral $F_{yr}$ force of the rear axle and the steering angle $\delta$ have opposite signs, the distribution is biased toward the inside front wheel. If anti-lock braking control is activated for the rear wheels before the desired braking force is developed, the undeveloped portion of the desired braking force is applied to the inside front wheel. If the driver is braking, and anti-lock braking is activated for both front and rear wheels, the brake command for the outside front wheel is reduced to achieve the desired yaw force. The block 352 compares the signs of the estimated lateral force at the rear axle $F_{yr}$ and the steering wheel angle $\delta$ by comparing the product $F_{yr}\delta$ to zero. If the product is less than zero, the signs are opposite, and block 356 is executed to set the inside rear force command $F_{ir}$ to 10% of the total corrective force F; otherwise, block 354 sets the inside rear force command $F_{ir}$ to 50% of the total corrective force F. If anti-lock brake (ABS) control is activated for the inside rear wheel, as determined at block 358, block 360 determines the braking force $F_{ira}$ at the onset of ABS control, and block 362 sets the inside front force command $F_{if}$ to the difference (F–$F_{ira}$). If ABS is not activated, block 362 sets the inside front force command $F_{if}$ to the difference (F–$F_{ir}$). If there is driver braking, and ABS control is activated for both front and rear inside wheels, as determined at blocks 358–368, block 370–374 are executed to determine a braking force command $F_{of}$ for the outside front wheel. The command $F_{of}$ is determined by determining the actual braking forces $F_{ifa}$ and $F_{ira}$ developed at the insider front and rear wheels, and computing the difference (F–$F_{ifa}$–$F_{ira}$). This difference cannot be negative, and is limited at block 374 to 50% of the driver commanded brake force $Bf_{of}$ for the outside front wheel.

In the oversteer condition, braking is applied to the outside front wheel only, and may be allowed to exceed the anti-lock braking limit. If the driver is braking, and anti-lock braking control is activated for the inside wheels before the desired braking force is developed, the brake command for the inside rear wheel (and possibly the inside front wheel) is reduced to achieve the desired yaw force. The brake force command $F_{of}$ for the outside front wheel is set to the total corrective force F at block 376. If there is no driver braking, as determined at block 378, the block 380 is executed to override any ABS activation for the outside front wheel. If there is driver braking, and ABS control is activated for the outside front wheel, as determined at blocks 378 and 382, the blocks 384–386 are executed to determine the actual braking force $F_{ofa}$ at the outside front wheel, and to set the brake force command $F_{if}$ for the inside front wheel equal to the difference (F–$F_{ofa}$). This difference cannot be negative, and is limited at block 388 to 50% of the driver commanded brake force $BF_{if}$ for the inside front wheel. Block 390 then sets the brake force command $F_{ir}$ for the inside rear wheel equal to the difference (F–$F_{ofa}$–$F_{ifa}$). Again, the difference cannot be negative, and is limited at block 392 to 50% of the driver commanded brake force $BF_{ir}$ for the inside rear wheel.

It will be understood that in the oversteer condition with driver braking, the brake force commands $F_{if}$ and $F_{ir}$ for the front and rear inside wheels represents a commanded reduction in braking force at such wheels. Similarly, in the understeer condition with driver braking, the brake force command $F_{of}$ for the front outside wheel represents a commanded reduction in braking force at such wheel.

It will be recognized that the subject invention is not limited to the above-described distribution strategy, and that other distribution strategies, such as described in the pending U.S. patent application Ser. Nos. 08/654,982 and 08/732,582, both of which are assigned to the assignee of this invention, could utilized alternatively.

In summary, then, the feed-forward yaw control of this invention provides an improved control that does not require a yaw sensor. Moreover, the control may be used in concert with a conventional closed-loop control to provide performance improvements of the kind demonstrated above in respect to FIGS. 7A–7B. Additionally, it is anticipated that various other modifications will occur to those skilled in the art, and that controls incorporating such modifications may fall within the scope of the present invention, which is defined by the appended claims.

The emodiments of the invention in which an exclusive property or privilege is claimed are defined as follows:

1. A vehicle active brake control having sensors for detecting vehicle speed and a driver steering input, wherein the control differentially brakes the vehicle wheels to impart a commanded yaw to the vehicle, the improvement wherein the commanded yaw is determined according to a method comprising the steps of:

determining a desired yaw rate as a function of the detected vehicle speed and driver steering input;

determining a first yaw command component in proportion to the desired yaw rate when such desired yaw rate is outside a first predefined dead-band window, said first yaw command component being limited to a first saturation threshold outside said first dead-band window;

determining a second yaw command component in proportion to a rate of change of said desired yaw rate when such rate of change is outside a second predefined dead-band window, said second yaw command component being limited to a second saturation threshold outside said second dead-band window;

summing said first and second yaw command components to form said commanded yaw.

2. The active brake control method of claim 1, including the step of:

determining a proportional gain as a function of the detected vehicle speed; and applying said proportional gain to said first yaw command component.

3. The active brake control method of claim 2, wherein said proportional gain increases with increasing vehicle speed.

4. The active brake control method of claim 1, including the step of:

determining a derivative gain as a function of the detected vehicle speed; and applying said derivative gain to said second yaw command component.

5. The active brake control method of claim 4, wherein said derivative gain increases with increasing vehicle speed when the vehicle speed is below a predetermined range, and decreases with increasing vehicle speed when the vehicle speed is above the predetermined range.

6. The active brake control method of claim 1, including the step of:

determining a proportional gain as a function of the detected vehicle speed; and applying said proportional gain to said desired yaw rate.

7. The active brake control method of claim 1, including the step of:

determining a derivative gain as a function of the detected vehicle speed; and applying said derivative gain to said rate of change of desired yaw rate.

8. The vehicle active brake control method of claim 1, including the steps of:

forming a sum of the determined first yaw command components, and multiplying such sum by a predetermined gain term to form a feedback signal; and decreasing said first yaw command component by said feedback signal prior to the summing of said first and second yaw command components.

9. A vehicle active brake control having sensors for detecting vehicle speed and a driver steering input, wherein the control differentially brakes the vehicle wheels to impart a commanded yaw to the vehicle, the improvement wherein the commanded yaw is determined according to a method comprising the steps of:

determining a desired yaw rate as a function of the detected vehicle speed and driver steering input;

determining a first yaw command component in proportion to the desired yaw rate if such first yaw command component is outside a first predefined dead-band window;

limiting said first yaw command component to a first saturation threshold outside said first dead-band window;

determining a second yaw command component in proportion to a rate of change of said desired yaw rate if such second yaw command component is outside a second predefined dead-band window;

limiting said second yaw command component to a second saturation threshold outside said second dead-band window;

summing said first and second yaw command components to form said commanded yaw.

10. A vehicle active brake control having sensors for detecting vehicle speed and a driver steering rate, wherein the control differentially brakes the vehicle wheels to impart a commanded yaw to the vehicle, the improvement wherein the commanded yaw is determined according to a method comprising the steps of:

integrating the detected driver steering rate to estimate a driver steering angle;

determining a desired yaw rate as a function of the detected vehicle speed and said estimated driver steering angle;

determining a first yaw command component in proportion to the desired yaw rate when such desired yaw rate is outside a first predefined dead-band window, said first yaw command component being limited to a first saturation threshold outside said first dead-band window;

determining a desired rate of change of yaw rate based on the detected vehicle speed and driver steering rate;

determining a second yaw command component in proportion to the desired rate of change of yaw rate when such rate of change is outside a second predefined dead-band window, said second yaw command component being limited to a second saturation threshold outside said second dead-band window; and summing said first and second yaw command components to form said commanded yaw.

11. The active brake control method of claim 10, including the steps of:

forming a sum of the estimated driver steering angles, and multiplying such sum by a predetermined gain term to form a feedback signal; and decreasing said estimated driver steering angle by said feedback signal prior to determining said desired yaw rate.

* * * * *